Patented Nov. 20, 1928.

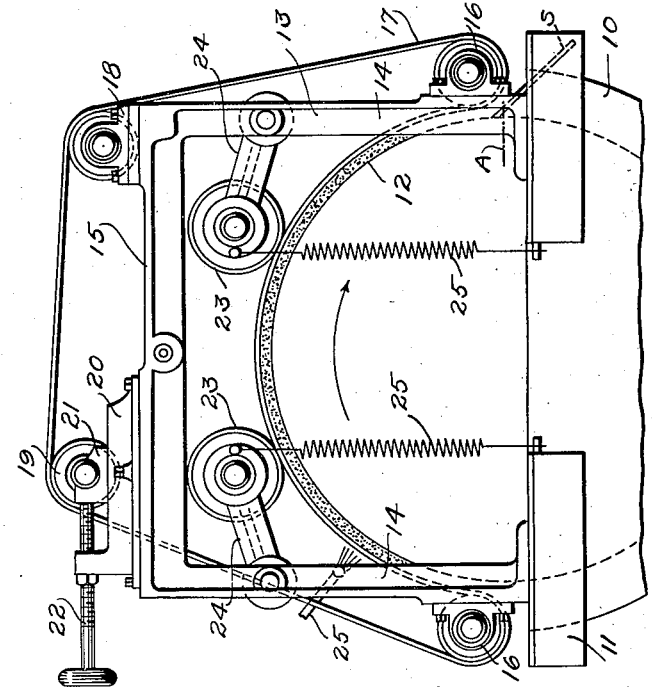
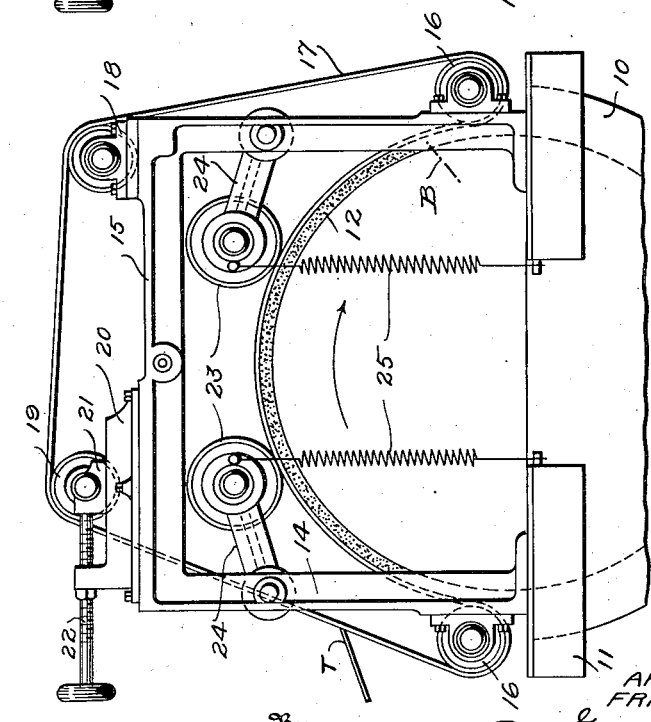

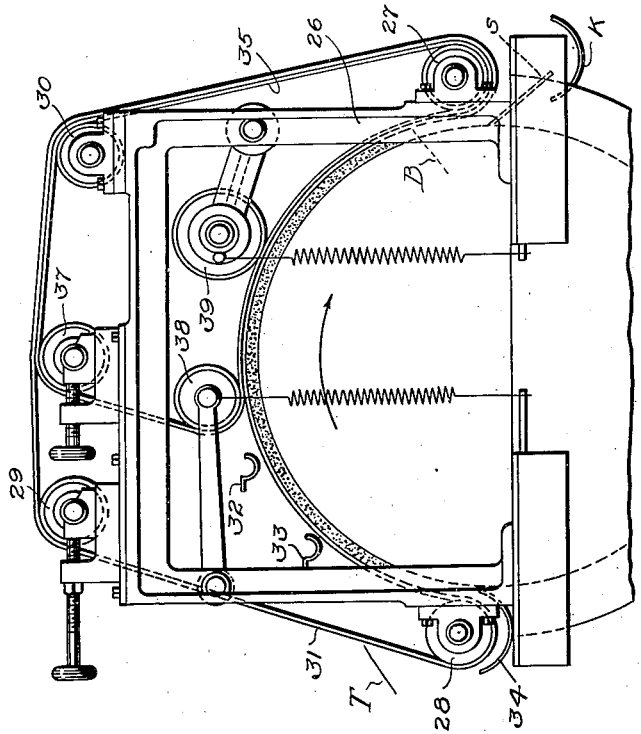
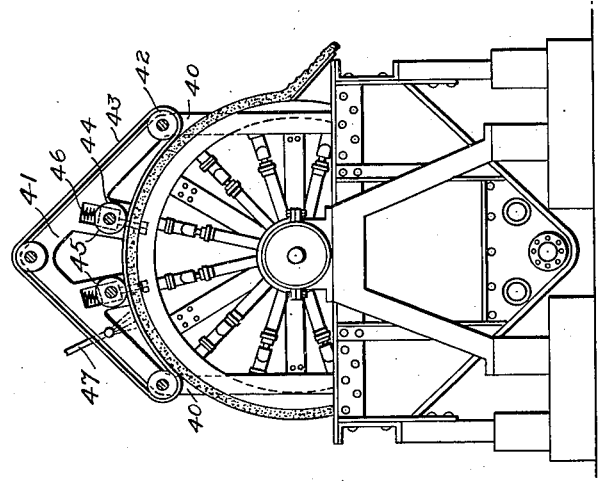

1,691,950

UNITED STATES PATENT OFFICE.

ARTHUR WRIGHT, OF UPPER MONTCLAIR, AND FRANK W. YOUNG, OF VERONA, NEW JERSEY.

FILTRATION APPARATUS.   REISSUED

Application filed September 10, 1921. Serial No. 499,753.

Our invention relates to a filter and more particularly to an apparatus for compressing and treating the filter cake, and which may be attached to or built as a part of a continuous rotary drum filter. Certain features of this invention are disclosed in our prior Patent No. 1,472,574 dated October 30, 1923.

In the operation of continuous rotary drum filters it has heretofore been the practice to wash or attempt to wash the solubles from the filter cake by atomizing the washing fluid and spraying it directly upon the filter cake. The quantity of washing fluid, however, is limited by this method, and considerable difficulty has also been experienced due to the clogging of the atomizing nozzles.

A further objectionable feature to the ordinary rotary drum filter has been caused by the contraction of the filter cake as it is dried, due to the air passing therethrough, and which contraction or shrinkage causes cracks to open up which allow the free and ready passages of air therethrough and thus materially decreasing the efficiency of the air drying.

A further objectionable feature to the ordinary rotary drum filter has been the difficulty in removing from the filtering medium relatively thin filter cakes such as experienced in the filtration of certain industrial liquors. Further, not only is it difficult to properly scrape the thin tenacious cakes from the filter cloth, but reversing the air so as to aid in removing the cake has merely tended to cause small areas of the cake to be blown out and has not tended to aid in the scraping and removing of the cake from the rest of the filtering medium.

It is accordingly an object of our invention to overcome the aforementioned difficulties and to provide a filter having a compressor attached thereto or formed as a part thereof whereby the cake may be properly washed and with a large excess of water or washing fluid without danger of disrupting or prematurely dislodging the filter cake from the filtering medium.

A further object is to proved for the proper drying of the filter cake and to this end the cake is compressed as it contracts and the opening up of local cracks or seams is accordingly prevented, thus insuring the efficient drying action of the inflowing air.

A further object is to provide for the effective and complete discharge of the filter cake from the filtering medium and thus provide for the handling of those liquors which build up a thin tenacious cake and which have heretofore been considered impossible to properly handle in a continuous rotary filter.

A further object is to accomplish the aforementioned ends in a simple and expeditious manner and to provide an apparatus which may be readily applied to a rotary drum filter already in service or may be formed as a part of a filter under construction, and with the foregoing and other objects in view our invention consists in the improved filter illustrated in the accompanying drawings and hereinafter described and claimed, and in such modifications and variations thereof as will be obvious to those skilled in the art to which our invention relates, it being understood that changes may be made within the scope of what is claimed without departing from the spirit of the invention.

In the accompanying drawings:

Figure 1 is a view in side elevation and partially in section of a filter cake compressor embodying the characteristic features of our invention;

Figure 2 is a similar view showing the parts arranged for the stripping of the filter cake from the filtering medium by the compressor belt and its subsequent discharge from the latter;

Figure 3 is a similar view of a slightly modified form of compressor; and

Figure 4 is a view in side elevation of a further modification.

Referring specifically to the several views, wherein similar reference numerals designate corresponding parts throughout, a rotary drum filter 10, including the usual tank 11 and rotary drum 12, is provided with an upstanding frame 13, upon which are mounted the various parts going to make up our novel filter compressor. The frame 13 includes the uprights or standards 14 and the cross or platform members 15. Mounted adjacent the lower ends of the upright standards 14 are the rollers 16, which are adapted to lead an endless belt 17 onto and from the exposed surface of the rotary filter drum 12.

A third roller 18 carries the belt after having passed from the drum and around the roller 16, up and across the top of the frame or platform 15, while a fourth take-up roller 19 leads the belt downwardly onto the entrance roller 16 and from which it again passes onto the drum and accordingly compresses the filter cake which is located thereon. The take-up roller is formed with the usual bed 20, roller carrying carriage 21 and the adjusting or tension screws 22, whereby the roller may be moved laterally and thus take up any slack in the belt 17 and provide for the proper amount of tension therein. In addition to the compressing effect exerted by the endless belt 17, a local compression is effected by the rollers 23 which are mounted upon the pivoted arms 24 and project inwardly toward the top of the drum 12 and are held in resilient contact with the belt 17 by the tension springs 25, the latter extending down to and being secured to any appropriate part of the frame.

With the parts as thus arranged the filter cake builds up upon the drum as the latter passes through the liquid within the tank and upwardly beneath the endless belt 17. As the drum is rotated and the cake contacts with the endless belt it drives the latter at a speed similar to the speed of the cake and periphery of the drum, so that there will be no danger of mutilation of the cake. A suitable liquid supply nozzle 47 is adapted to supply water or a wash liquid to the upper surface of the belt 17 as it passes onto the drum and filter cake, which wash liquid permeates and drenches the belt and passes through to the cake and so completely washes the same without danger of dislodging the cake from the filter medium. The discharge of the wash liquid and soluble content of the cake is further aided as it passes beneath the first local compression roller 23, and which roller in connection with the general tension of the belt 17 compresses the cake and accordingly tends to dry the same. The vacuum which causes the depositing of the filter cake upon the filtering medium tends to draw the air through the endless belt and filter cake, causing an additional compression of the belt upon the filter cake, as well as tending to dry the latter due to the percolation of air therethrough. The two local compression rollers 23 likewise compact the cake and prevent any local seams or cracks from opening up which would allow for the free passage of air therethrough and thus materially interfere with the general drying of the cake. The vacuum is maintained until about the point indicated at A in Figure 1, so that the endless belt is led away from the filter drum and the filter cake while the vacuum is still effective, so that the cake will not adhere to the endless belt but will remain upon the filtering medium. After the point A the vacuum is released and the cake will be readily removed by a scraper S. It has been found that the drying and contacting of the cake by the endless belt 17 and local compression rollers renders the cake particularly susceptible to the action of the scraper S, the cake being completely removed from the filter medium, which is accordingly again ready to perform its maximum service.

A somewhat different mode of operation is carried out in the compressor illustrated in Figure 2, which is constructed similar to that shown and described in Figure 1, the difference being that in the filtering of liquids wherein only a thin but very tenacious cake is built up, it cannot be completely and effectively scraped from the filtering medium, as the scraper merely tends to plaster or smear the cake over the entire filtering medium rather than stripping or removing the same. We have found that our apparatus is particularly effective in the handling of these liquors and to this end the vacuum which has been drying the cake is cut off or released at a point B, somewhat above the point at which the endless belt 17 is removed or led away from the filtering drum. The vacuum, being released from the drum, provides that as the endless belt 17 is considerably more dense and closely woven than the filtering medium it will accordingly prevent the atmospheric pressure from reaching the upper surface of the filter cake as readily and quickly as it will reach the lower surface through the filtering cloth or filtering medium, providing that the filter cake will adhere, and stick to the endless belt 17 and accordingly be stripped from the filtering medium. A suitable scraper T is brought into contact with the endless belt and will remove the filter cake which is adhering thereto. While the thin and tenacious cake will in a measure tend to adhere to the endless belt and become smeared or plastered thereon, yet the same is of little or no disadvantage, as it is not at all essential that the endless belt 17 be maintained clean in the same sense that it is essential that the filtering medium be completely stripped of the filter cake prior to its re-passage into the liquid. The scraper T may be located anywhere along the endless belt 17 after it has passed from or before its re-passage to the drum, although we have found it works very effectively when placed as shown, on the down traveling side of the apparatus.

The modified form of compressor illustrated in Figure 3 includes the usual frame comprising the upright standards 26, the lower endless belt rollers 27—28, the takeup roller 29, and a second elevated roller 30, the same being adapted to lead the endless belt 31 around the upper exposed portion of the rotary filter drum and from thence upwardly across the frame and back to the lower roller 28, so that the belt will be driven by the rotary drum and will compress the cake which is located upon the upper exposed portion thereof. It has been found, however, that an endless belt which is particularly adapted to compress the cake and prevent the too rapid passage of air therethrough does not embody the maximum qualities for the proper reception of the washing fluid, and to this end the compressor illustrated in Figure 3 is provided with two belts, the belt 31 being formed of an absorbent fabric which is particularly adapted to receive the washing fluid so that a large excess of the washing fluid may be used which will readily penetrate the belt 31 and effectually wash the cake which is located therebeneath. To this end the open troughs 32—33 are provided, which receive the washing fluid therein and upon becoming filled, spill or discharge the washing fluid onto the absorbent belt, the excess washing fluid being collected in the lower receiving trough 34 and from which it may be again delivered to the troughs 32 and 33. A second endless belt 35 is provided and in order to properly support the same an additional upper take-up roller 37 is provided and over which the belt extends. The belt then passes down beneath the initial local compression roller 38 and beneath the second local compression roller 39, traveling along with the first-mentioned belt 31 across the upper portion of the rotary drum filter, then beneath the lower roller 27, up and around the elevated roller 30, and from thence across the take-up roller 37, and compressing, drying and compacting the cake during such passage. The vacuum which has been used in drying the cake is cut off at a point B somewhat above the point at which the belt 31 is led away from the filtering medium. The filter cake will therefore adhere and stick to the endless belt 17 and accordingly be stripped from the filtering medium. The filter cake is removed from the belt 31 by the scraper T. Any cake adhering to the filtering medium is stripped therefrom and discharged by the scraper S in the usual manner and dropped into the cake conveyor or suitable apparatus K.

The somewhat further modified form of our compressor illustrated in Figure 4 is formed with the upright standards 40 upon which are mounted the triangular frames 41 carrying the rollers 42 at the apices thereof and around which extends the endless compression belt 43, the same contacting with the upper surface of the filter drum and adapted to compress and compact the cake which is located thereon. Suitable local compression rollers 44 are carried by the lugs 45 and forced into contact with the belt by the compression springs 46. A suitable spraying nozzle 47 is adapted to provide water or a wash liquid to the upper surface of the endless belt and through which it passes and onto the cake for the washing of the latter.

From the foregoing it will be apparent that our improved compressor may be applied to any rotary drum filter which is already installed or may be formed as an integral part of a filter which is under construction. Further, that the number of rollers may be varied, as well as the other minor details changed without departing from the spirit of our invention.

Having thus described our invention, we claim and desire to secure by Letters Patent:

1. The process of treating a filter cake formed on the filtering medium of a rotary drum filter which comprises overlaying the cake on the filtering medium with a compression member and thereby compressing the cake, moving the compression member with the cake by its contact therewith, and then separating the compression member and filtering medium and stripping the cake from the filtering medium.

2. The process of treating a filter cake formed on a filtering medium which comprises overlaying the cake on the filtering medium with a compression member and thereby compressing the cake, subjecting the cake while so overlayed to local compression, and then separating the compression member and filtering medium and stripping the cake from the filtering medium.

3. The process of treating a filter cake formed on a filtering medium which comprises overlaying the cake on the filtering medium with a covering, passing wash liquid through the covering, cake and filtering medium while the cake is so located, and then separating the covering and filtering medium and stripping the cake from the filtering medium.

4. The process of treating a filter cake formed on a filtering medium which comprises overlaying the cake on the filtering medium with a covering, passing wash liquid through the covering, cake and filtering medium while the cake is so located, then overlaying the cake with a compression member and thereby compressing the cake, and then separating the covering and compression member from the filtering medium and stripping the cake from the filtering medium.

5. The process of treating a filter cake formed on a filtering medium which comprises overlaying the cake on the filtering medium with a covering of less perviousness than the filtering medium, subjecting the cake to vacuum while so located, separating the covering and the filtering medium and prior thereto increasing the pressure acting on the cake through the filtering medium and thereby causing the cake to adhere to the covering and be stripped from the filtering medium.

6. The process of treating a filter cake formed on a filtering medium which comprises progressively bringing into contact with the filter cake on the filtering medium a member of less perviousness than the filtering medium and subjecting the cake to vacuum while on the filtering medium, progressively separating said member and the filtering medium and prior thereto increasing the pressure acting on the cake through the filtering medium and thereby causing the cake to adhere to said member and be stripped from the filtering medium.

7. The process of treating a filter cake formed on a filtering medium which comprises overlaying the cake on the filtering medium with a compressing and covering member and thereby compressing the cake, passing wash liquid through the covering, cake and filtering medium, and then separating the compression member and filtering medium and stripping the cake from the filtering medium.

8. The process of treating a filter cake formed on a filtering medium which comprises overlaying the cake on the filtering medium with a covering, passing wash liquid through the covering, cake and filtering medium while the cake is so located, subjecting the cake so located to local compression, and then separating the compression member and filtering medium and stripping the cake from the filtering medium.

9. The process of treating a filter cake formed on a filtering medium which comprises overlaying the cake on the filtering medium with a contacting freely movable covering of less perviousness than the filtering medium, subjecting the cake so located to vacuum acting through the filtering medium, and then separating the compression member and filtering medium and stripping the cake from the filtering medium.

10. The process of treating a filter cake formed on a filtering medium which comprises subjecting the cake on the filtering medium to vacuum acting through the filtering medium and thereby drying the cake, and compressing the cake throughout an extended area of its surface during the drying thereof.

11. The method of treating a filter-cake formed upon a filtering member which comprises advancing the cake bearing filtering member out of the bath of liquor to be filtered toward a point at which the cake is stripped therefrom, progressively bringing the cake into the influence of compression between the filtering member and an overlying compression member moving with the cake and by its contact therewith, subjecting the cake to local compression by applying pressure at at least one point on the exposed surface of the compression member during the advancement of the cake so located, progressively separating the compression and filtering members and stripping the cake from the filtering member.

12. An apparatus of the class described for use in connection with rotary drum filters comprising a frame, rollers carried thereby, an endless compressor belt carried by said rollers and adapted to contact with and compress the filter cake as located upon said rotary drum filter, means whereby one of said rollers may be shifted to regulate the tension of said belt, and local compression rollers contacting with that portion of the endless belt which is in contact with the rotary drum filter.

13. An apparatus of the class described for use in connection with rotary drum filters, comprising a frame, rollers carried thereby, and endless compressor belt carried by said rollers and adapted to contact with and compress the filter cake as located upon said rotary dr n filter, means whereby one of said rollers may be shifted to regulate the tension of said belt, and local compression rollers contacting with the endless belt and adapted to resiliently force the same against the filter drum and the filter cake which is located thereon.

14. An apparatus of the class described for use in connection with rotary drum filters, comprising a frame, rollers carried thereby, an endless compressor belt carried by said rollers and adapted to contact with and compress the filter cake as located upon said rotary drum filter, means whereby one of said rollers may be shifted to regulate the tension of said belt, local compression rollers contacting with the endless belt and adapted to resiliently force the same against the filter drum and the filter cake which is located thereon, and means for stripping such of the filter cake as may adhere to the endless belt.

15. An apparatus of the class described for use in connection with rotary drum filters, comprising a frame, rollers carried thereby, an endless compressor belt carried by said rollers and adapted to contact with and compress the filter cake as located upon said rotary drum filter, means whereby one of said rollers may be shifted to regulate the tension of said belt, local compression rollers contacting with the endless belt and adapted to resiliently force the same against the filter drum and the filter cake which is located thereon, and means for supplying a wash liquid to the upper surface of a portion of the endless belt which is in contact with the filter cake.

16. An apparatus of the class described comprising a frame, rollers mounted thereon, an endless belt carried by said rollers and adapted to contact with and compress the filter cake as located upon the drum of a rotary filter, and a second endless belt carried by said rollers, and means for supplying a wash liquid to the second-mentioned endless belt.

17. An apparatus of the class described for use in connection with rotary drum filters, comprising a frame, rollers carried thereby, an endless belt carried by said rollers, a second endless belt contacting with the first-mentioned endless belt and carried by said rollers, means for supplying a wash liquid to the second-mentioned endless belt, and local compression rollers adapted to force said endless belt into contact with and locally compress the filter cake.

18. A suction strainer comprising a revolving drum, a filtering medium carried on the periphery thereof, said drum being supported with a part of said filtering medium immersed in the liquor to be filtered, and an endless belt of less perviousness than said filtering medium and running over a portion of the filtering medium not immersed and driven by contact with the filter cake thereon.

19. The combination of a rotary drum filter, and a compression member contacting and compressing the filter cake formed on the filtering medium and mounted for linear movement with said filter cake by its contact therewith.

20. Apparatus of the class described comprising a drum filter counted for rotation and having a filtering medium on the periphery thereof, an endless belt, and rollers supporting said enless belt and holding a portion thereof in contact with said filtering medium, whereby filter cake formed on said filtering medium is compressed by said endless belt and said endless belt is driven by contact with said cake.

21. Apparatus of the class described comprising a rotary drum filter provided with a filtering medium on the periphery thereof, an endless belt contacting with a portion of the filter cake formed on said filtering medium and driven thereby.

22. Apparatus of the class described comprising a rotary drum filter provided with a filtering medium on the periphery thereof, an endless belt contacting with a portion of the filter cake formed on said filtering medium and means for applying a wash liquid to the exposed face of that portion of said endless belt which is in contact with the filter cake.

23. Apparatus of the class described comprising a rotary drum filter having a filtering medium on the periphery thereof, an endless belt contacting with a portion of the cake formed on said filtering medium, and local compression rollers engaging the exposed surface of that portion of said endless belt which is in contact with said cake.

24. Apparatus of the class described comprising a rotary drum filter provided with a filtering medium on the periphery thereof, an endless belt contacting with a portion of the cake formed on said filtering medium and travelling with said cake at the same rate of speed, and means for subjecting the cake located between said belt and medium to vacuum acting through said medium.

25. Apparatus of the class described comprising a rotary drum filter provided with a filtering medium on the periphery thereof, an endless belt contacting with a portion of the cake formed on said filtering medium, means for subjecting the cake located between said belt and medium to vacuum acting through said medium, said belt being arranged to be led away from said cake, and means for increasing the pressure acting upon the cake through said filtering medium prior to the leading away of said belt, whereby the cake is stripped from said filtering medium by said belt.

26. Apparatus of the class described comprising a rotary drum filter provided with a filtering medium on the periphery thereof, a compression member mounted for progressive movement into and out of engagement with said filtering medium and the cake thereon, means for subjecting the cake on the filtering medium to vacuum acting through said medium, and means for increasing the pressure acting on the cake through said filtering medium prior to the movement of said compression member out of contact with said medium.

27. Apparatus of the class described comprising a rotary drum filter provided with a filtering medium on the periphery thereof, a cover overlying a portion of the cake formed on said medium, means for applying wash liquid to the exposed surface of said cover, and local compression rollers acting upon said exposed surface.

Signed at New York, borough of Manhatten, in the county of New York and State of New York, this 8th day of September, A. D. 1921.

ARTHUR WRIGHT.

Signed at New York, borough of Manhattan, in the county of New York and State of New York this 8th day of September, A. D. 1921.

FRANK W. YOUNG.